United States Patent
Allermann et al.

(10) Patent No.: US 9,284,415 B2
(45) Date of Patent: Mar. 15, 2016

(54) OXYGEN TAILORING OF POLYETHYLENE

(71) Applicant: ExxonMobil Chemical Patents Inc., Baytown, TX (US)

(72) Inventors: Gerd A. Allermann, Overijse (BE); Danny Van Hoyweghen, Heverlee (BE); Steven A. Best, The Woodlands, TX (US); Anthony Poloso, Houston, TX (US); Nicolas M. De Ketelaere, Tourinnes-la-Grosse (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/382,812

(22) PCT Filed: Dec. 12, 2012

(86) PCT No.: PCT/US2012/069125
§ 371 (c)(1),
(2) Date: Sep. 4, 2014

(87) PCT Pub. No.: WO2013/137953
PCT Pub. Date: Sep. 19, 2013

(65) Prior Publication Data
US 2015/0038624 A1 Feb. 5, 2015

Related U.S. Application Data

(60) Provisional application No. 61/611,089, filed on Mar. 15, 2012.

(51) Int. Cl.
*C08J 3/00* (2006.01)
*C08J 3/20* (2006.01)
(Continued)

(52) U.S. Cl.
CPC .. *C08J 3/005* (2013.01); *C08J 3/20* (2013.01); *C09D 123/06* (2013.01); *H01B 3/441* (2013.01); *C08F 2810/40* (2013.01); *C08J 2323/06* (2013.01)

(58) Field of Classification Search
CPC .............. C08J 3/00; C08J 3/20; C09D 123/06
See application file for complete search history.

(56) References Cited

U.S. PATENT DOCUMENTS

| 4,528,151 A | 7/1985 | Matsuo et al. |
| 5,728,335 A | 3/1998 | Neubauer |

(Continued)

FOREIGN PATENT DOCUMENTS

| DE | 300 175 | 5/1992 |
| EP | 0 743 327 | 11/1996 |

(Continued)

OTHER PUBLICATIONS

Google translation of DD 300 175 patent.

*Primary Examiner* — Robert Harlan
(74) *Attorney, Agent, or Firm* — Leandro Arechederra, III

(57) ABSTRACT

Processes are disclosed for oxygen-tailoring polyethylene, particularly polyethylenes suitable for wire and cable applications. One process includes conveying a first polyethylene having a melt index ≤5.0 and an MWD ≤5.0 through mixing or extrusion apparatus having a feed zone, a melt-mixing zone downstream of the feed zone, and a melt zone downstream of the melt-mixing zone, wherein the temperature of the first polyethylene in the melt zone ranges from about 180° C. to about 300° C.; and contacting the first polyethylene with an amount of an oxygen-containing gas having at least about 20.0 parts by weight oxygen per million per parts by weight of the first polyethylene (ppm (wt) $O_2$). Polyethylene compositions having improved properties, particularly for wire and cable applications are disclosed.

22 Claims, 4 Drawing Sheets

(51) Int. Cl.
*C09D 123/06* (2006.01)
*H01B 3/44* (2006.01)

(56) References Cited

U.S. PATENT DOCUMENTS

| | | |
|---|---|---|
| 5,739,266 A | 4/1998 | Piana |
| 5,962,598 A | 10/1999 | Mack et al. |
| 6,147,187 A | 11/2000 | Melief et al. |
| 6,454,976 B1 | 9/2002 | Neubauer |
| 6,989,423 B2 | 1/2006 | Wagner et al. |
| 7,285,617 B2 | 10/2007 | Poloso et al. |
| 2004/0019155 A1 | 1/2004 | McLeod et al. |
| 2004/0082722 A1 | 4/2004 | McLeod et al. |
| 2006/0079664 A1* | 4/2006 | Poloso et al. ............ 528/483 |
| 2011/0240333 A1* | 10/2011 | Junqvist et al. ......... 174/110 SR |

FOREIGN PATENT DOCUMENTS

| | | |
|---|---|---|
| EP | 1 229 053 | 8/2002 |
| JP | 11-106429 | 4/1999 |
| WO | 85/04664 | 10/1985 |
| WO | 2004/005357 | 1/2004 |

\* cited by examiner

OXYGEN TAILORING OF POLYETHYLENE

PRIORITY CLAIM

This application claims priority to U.S. Provisional Application Ser. No. 61/611,089 filed Mar. 15, 2012, and International Application No. PCT/US2012/069125 filed Dec. 12, 2012, the disclosure of each is incorporated herein by reference in its entirety.

FIELD OF THE INVENTION

The present invention is directed to methods of extruding polyethylene homopolymer and copolymer polyethylenes. More particularly, the invention provides methods of oxygen tailoring polyethylene for wire and cable applications.

BACKGROUND

Polyethylene compositions, particularly compositions having a narrow molecular weight distribution, can suffer from melt flow instability (i.e., melt fracture) during processing for coating applications, e.g., wire and cable. Melt instability is believed to be related to the high shear rates such compositions require in these applications. In addition reactive processing, e.g., silane grafting and/or crosslinking, also impact the ability to efficiently and effectively process the compositions for these applications. Thus, it would be useful to provide a process for improving the processibility of certain polyethylene compositions having improved performance in applications (e.g., cast film and wire and cable) wherein the process preferably does not detrimentally effect, and more preferably, augments, reactive processing.

SUMMARY

In one aspect, embodiments of the invention provide a process for oxygen-tailoring a polyethylene, the process comprising: (a) conveying the polyethylene having a melt index ≤5.0 and an MWD ≤5.0 through an extrusion apparatus, the extrusion apparatus having a feed zone, a melt-mixing zone downstream of the feed zone, and a melt zone downstream of the melt-mixing zone, wherein the temperature of the polyethylene in the melt zone ranges from about 180° C. to about 300° C., preferably about 210° C. to about 260° C.; and (b) contacting the polyethylene with an amount of an oxygen-containing gas having at least about 20 parts by weight oxygen per million parts by weight polyethylene (ppm (wt) $O_2$).

In another aspect, embodiments of the invention provide a method for selectively increasing the high-load melt index of a polyethylene, the method comprising (a) conveying a first polyethylene having a melt index ≤5.0 g/10 min. and a high-load melt index through an extrusion apparatus, the extrusion apparatus having a feed zone, a melt-mixing zone downstream of the feed zone, and a melt zone downstream of the melt-mixing zone, wherein the temperature of the polyethylene in the melt zone ranges from about 180° C. to about 300° C., preferably about 210° C. to about 260° C.; (b) contacting the polymer with an amount of an oxygen-containing gas having at least about 20 parts by weight oxygen per million parts by weight polyethylene (ppm (wt) $O_2$); and (c) thereby forming a tailored polyethylene having a melt index within 40.0% of the melt index of the first polyethylene and a high-load melt index at least 20.0% higher than the high-load melt index of the first polyethylene. Embodiments of the inventions may further comprise forming the tailored polyethylene into an article such as a wire and cable coating.

In another aspect, embodiments of the invention provide polyethylene suitable for extrusion coating and polyethylene extrusion coated articles. For example, a wire and cable coating composition comprising a polyethylene having a density of 0.915 g/cm³ to 0.940 g/cm³, a high-load melt index of 25.0 to 600.0 g/10 min., a melt index ratio ($I_{21.6}/I_{2.16}$) of 60.0 to 150.0, and a MWD of 3.0 to 10.0 is provided. In some compositions that are particularly suitable for wire and cable coating applications, the polyethylene has a silane content ≤1.0 wt. %, preferably 0.6 wt. %, or 0.8 wt. %, based on the total weight of the polyethylene.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
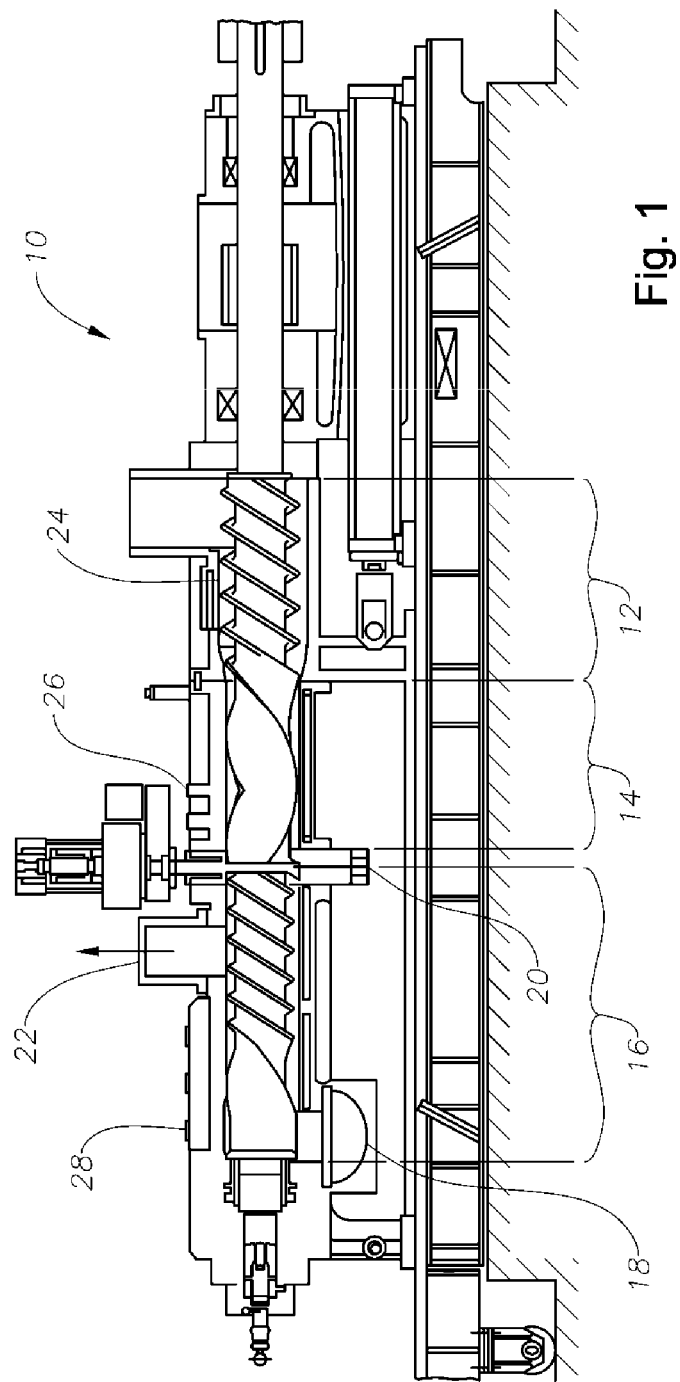
FIG. 1 is a schematic diagram of a mixer design useful in an embodiment of the invention.

Embodiments of the invention provide a process for modifying the rheological properties of polyethylene compositions that are traditionally difficult to process for certain applications, e.g., wire and cable coatings. Generally, the process comprises (a) conveying a polyethylene to be modified for coating applications through a mixing or extrusion apparatus having a feed zone, a melt-mixing zone downstream of the feed zone, and a melt zone downstream of the melt-mixing zone at an appropriate temperature; and (b) contacting the polyethylene with an amount of an oxygen-containing gas having at least about 20 parts by weight oxygen per million parts by weight polyethylene (ppm (wt) $O_2$).

Melt index values recited herein are determined from measurements performed according to ASTM D-1238, Condition 190° C./2.16 kilogram (kg) and are conventionally referred to as $I_{2.16}$ or $I_2$. Melt index is inversely proportional to the molecular weight of the polymer. Thus, the higher the molecular weight, the lower the melt index, although the relationship is not linear. The "high-load" melt index values recited herein are determined from measurements performed according to ASTM D-1238, Condition 190° C./21.6 kilogram (kg) and are conventionally referred to as $I_{2.16}$ or $I_{21}$. The term "melt index ratio" as used herein refers to the ratio of the high-load melt index to the melt index, i.e., $I_{21.6}/I_{2.16}$. The term "melt flow ratio" as used herein refers to the $I_{10}/I_{2.16}$ ratio, where $I_{10}$ is determined according to ASTM D-1238, Condition 190° C./10.0 kilogram (kg).

The term "molecular weight distribution" or "MWD" refers to the ratio of weight average molecular weight to the number average molecular weight, i.e., Mw/Mn, as determined by ASTM 6579, wherein the gel chromatograph CPC 220 is operated at 135° C. Approximately 40 mg of polymer is dissolved in 4.1 ml of trichlorobenzene at 160° C. with mixing for 4 hours using a flow rate of 1.0 ml/min. and an injection volume of 300 microliters. Polystyrene standards of known molecular weight are used to calibrate the system.

Density (g/cm$^3$) values recited herein may be determined using chips cut from plaques compression molded in accordance with ASTM D-1928-96 Procedure C, aged in accordance with ASTM D618 Procedure A, and measured according to ASTM D1505-96.

The First Polyethylene

Polyethylene compositions suitable for conveying through the mixing or extrusion apparatus include polyethylene homopolymers and/or ethylene copolymers comprising ethylene and one or more $C_3$-$C_{20}$ alpha-olefin comonomers. As used herein, the terms "polyethylene," "ethylene copolymer," and the like indicate a polymer that comprises >50.0 wt. %, preferably >85.0 wt. % polymer units derived from ethylene, the remaining polymer units being derived from one or more comonomers, preferably selected from $C_3$-$C_{20}$ α-olefins or $C_3$-$C_{12}$ α-olefins. Suitable α-olefin comonomers can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene; 3-methyl-1-butene; 3,3-dimethyl-1-butene; 1-pentene; 1-pentene with one or more methyl, ethyl, or propyl substituents; 1-hexene with one or more methyl, ethyl, or propyl substituents; 1-heptene with one or more methyl, ethyl or propyl substituents; 1-octene with one or more methyl, ethyl, or propyl substituents; 1-nonene with one or more methyl, ethyl, or propyl substituents; ethyl, methyl, or dimethyl-substituted 1-decene; 1-dodecene; and styrene. Particularly preferred comonomers are 1-butene, 1-hexene, and 1-octene. It should be appreciated that the list of comonomers above is merely exemplary, and is not intended to be limiting.

Optionally, other comonomers can be used in minor amounts, such as less than 5 mol %, and such minor comonomers include polar vinyl olefins, for example, such as vinyl acetate, methyl acrylate, butyl acrylate, and acrylic acid; conjugated and non-conjugated dienes; acetylene and aldehyde monomers. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene, 3,7-dimethyl-1,6-octadiene, and 3,7-dimethyl-1,7-octadiene; (c) single ring alicyclic dienes, such as 1,4-cyclohexadiene, 1,5-cyclo-octadiene, and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene, alkenyl, alkylidene, cycloalkenyl, and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

In embodiments of the invention, the first polyethylene has a melt index ≤5.0 g/10 min. Preferably, the melt index of the first polyethylene is from 0.05 to 4.5 g/10 min. In some embodiments, the lower limit on the range of the melt index is 0.1 g/10 min., 0.2 g/10 min., 0.5 g/10 min., 0.75 g/10 min., 1.0 g/10 min., 1.2 g/10 min., 1.5 g/10 min., 1.7 g/10 min., 1.8 g/10 min., or 1.9 g/10 min. The upper limit on the melt index can be 0.1 g/10 min., 0.2 g/10 min., 0.5 g/10 min., 0.75 g/10 min., 1.0 g/10 min., 1.2 g/10 min., 1.5 g/10 min., 1.7 g/10 min., 1.8 g/10 min., or 1.9 g/10 min. While the range of suitable melt indices can be any combination of lower and upper limits, the melt index of the polyethylene is preferably from 0.1 to 3.0 g/10 min., 0.15 to 2.0 g/10 min., or 0.30 to 1.0 g/10 min.

The first polyethylene also has a high-load melt index. The lower and upper limits on the range of the high-load melt index may individually be selected from 0.75 g/10 min., 1.0 g/10 min., 2.0 g/10 min., 4.0 g/10 min., 10.0 g/10 min., 15.0 g/10 min., 25.0 g/10 min., 30.0 g/10 min., 50.0 g/10 min., 75.0 g/10 min., 100.0 g/10 min., 125.0 g/10 min., 150.0 g/10 min., 175.0 g/10 min., 205.0 g/10 min., 250.0 g/10 min., 265.0 g/10 min., 300.0 g/10 min., or 350.0 g/10 min. While the high-load melt index range can be any combination of lower and upper limits, some exemplary high-load melt index ranges are include about 0.75 to 350.0 g/10 min., about 1.5 to 210.0 g/10 min., about 2.25 to 140.0 g/10 min., or about 4.5 to 70.0 g/10 min.

The first polyethylene typically has a melt index ratio, $I_{21.6}/I_{2.16}$, of 10.0 to 100.0. The lower and upper limits on the range of the melt index ratio may individually be selected from 15.0, 20.0, 25.0, 30.0, 40.0, 50.0, 60.0, 75.0, or 100.0. While the range of suitable melt index ratio can be any combination of lower and upper limits, in some exemplary embodiments the melt index ratio is from 15.0 to 80.0 g/10 min., 20.0 to 70.0 g/10 min., 25.0 to 60.0 g/10 min., or 30.0 to 50.0 g/10 min.

The first polyethylene can also have a density of from 0.890 to 0.970 g/cm$^3$. In another embodiment, the polyethylene has a density of from 0.910 to 0.950 g/cm$^3$, preferably 0.915 to 0.940 g/cm$^3$, preferably 0.918 to 0.925 g/cm$^3$, produced in a gas phase or in a slurry process. In another embodiment, the polyethylene has a MWD of 1.1 to 10.0, 2.0 to 7.0, or 3.0 to 6.0. Polyethylene having a density ≤0.940 g/cm$^3$ and does not contain long chain branching is sometimes referred to as "linear low density polyethylene" ("LLDPE"). LLDPE can be produced with conventional Ziegler-Natta or chromium-based catalysts or with metallocene catalysts.

LLDPEs useful herein include copolymers of ethylene and at least one α-olefin having from 3 to about 20 carbon atoms and have a composition distribution breadth index (CDBI) of at least 70%, a melt index (MI), measured at 190° C. and 2.16 kg, of from about 0.1 to about 2.0 g/10 min., a density of from about 0.910 to about 0.945 g/cm$^3$, and a MWD of from about 2.5 to about 5.5.

LLDPEs suitable for use in embodiments of the invention also include ethylene copolymers comprising at least 50.0 wt. % ethylene, and have up to 50.0 wt. %, preferably 1.0 wt. % to 35.0 wt. %, even more preferably 1.0 wt. % to 6.0 wt. % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymers have a density of 0.910 to 0.950 g/cm$^3$ (preferably 0.915 to 0.940 g/cm$^3$, preferably 0.918 to 0.925 g/cm$^3$) and a CDBI of 60% to 80%, preferably between 65% and 80%. These polymers generally have an MWD of 1.1 to 8.0, preferably 1.5 to 5.0, more preferably 2.0 to 3.5. Preferably these polymers are metallocene polyethylenes (mPEs).

Some such LLDPE's are available from ExxonMobil Chemical Company under the trade name EXCEED™ mPE polyethylenes. Particularly preferred LLDPEs of this type are ethylene/octene copolymer having a melt index of from about 0.5 g/10 min. to about 10.0 g/10 min., particularly from about 0.5 g/10 min., to about 4.5 g/10 min., preferably 0.5 g/10 min., to about 2.0 g/10 min.

Still other suitable LLDPEs include ethylene copolymers comprising mPEs described in U.S. 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a melt index of from 0.1 to 15.0; a CDBI of at least 70%, a density of from 0.910 g/cc to 0.945 g/cc; a Haze (ASTM D1003) value of less than 20.0; a melt index ratio of from 35.0 to 80.0; an averaged Modulus (M) (as defined in U.S. Pat. No. 6,255,426) of from 20,000 psi to 60,000 psi (13790 N/cm$^2$ to 41369 N/cm$^2$) and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength (referred to herein as PE3). Typically, LLDPEs of this type have an Mw/Mn of 1.1 to 7.0 preferably, 2.0 to 5.0, more preferably 3.0 to 4.0. Some such LLDPEs are available from ExxonMobil Chemical Company under the trade name ENABLE™ mPE polyethylenes. Particularly preferred LLDPEs are ethylene/hexene copolymers having a melt index of from ≤2.0 g/10 min. particularly 1.5 g/10 min., or from about 0.1 g/10 min., to 1.0 g/10 min., and have a density of from 0.910 to 0.940 g/cm$^3$, preferably 0.915 to 0.930 g/cm$^3$, more preferably 0.920 to 0.930 g/cm$^3$.

Still other suitable polymers are substantially linear ethylene polymers characterized as having: a) a melt flow ratio, $I_{10}/I_{2.16}$, ≥5.63; b) a MWD, Mw/Mn, defined by the equation: Mw/Mn ≤($I_{10}/I_{2.16}$)−4.63; and optionally c) a critical shear stress at onset of gross melt fracture of greater than about 4×10$^6$ dyne/cm$^2$, wherein the olefin polymer is further characterized as a copolymer of ethylene with a $C_3$-$C_{20}$ alpha-olefin, as described in U.S. Pat. No. 5,272,236 and U.S. Pat. No. 5,278,272, each of which is incorporated herein by reference in its entirety.

The Tailoring Process

The first polyethylene is processed in a mixer, such as a co- or counter-rotating, intermeshing or non-intermeshing twin screw mixer and single screw co-kneader. Such mixers are well known in the art and are commercially available from various sources, such as Kobe, Farrel, Werner & Pfleiderer, and others. The polyethylene is fed to the feeding zone of the mixer and heated to a temperature below its melting temperature as it is compressed and conveyed toward the melt-mixing zone. Typically, the temperature in the feeding zone is about 68° F. to about 212° F. (about 20° C. to about 100° C.), and is maintained by cooling the extruder walls. In the melt-mixing zone, the temperature is increased to at least partially melt the polyethylene. In the melt zone, the temperature is sufficient to melt essentially all of the polyethylene to provide a molten polyethylene. The temperature in the melt zone should be between about 355° F. (180° C.) to about 575° F. (300° C.), preferably 410° F. (210° C.) to about 546° F. (280° C.), preferably between about 430° F. (220° C.) to about 507° F. (260° C.). Each zone is typically only partially filled with the polymer, preferably there are no completely filled zones. Although the terms "mixer" and "extruder" are often used loosely and interchangeably, one skilled in the art will appreciate that mixers, such as the commercially available Kobe or Farrel mixers, operate at relatively low pressures, typically about 100 psi (689 kPa) or less, and the zones within the mixer are generally not completely filled with polyethylene. In contrast, extruders, such as are commercially available from, for example, Werner-Pfleiderer, operate at much higher pressures, typically at least several hundred or several thousand psi, and the various zones within the extruder are generally completely filled with polyethylene.

Although not limited to any particular mixer or extruder, a process of the invention is illustrated now by specific reference to FIG. 1, showing a schematic diagram of a mixer 10. Mixer 10 includes a feed zone 12, a mixing zone 14, and a melt-conveying zone 16. Polymer and optional additives are provided to mixer 10 in the feed zone 12, and the polymer is conveyed in a downstream direction through the mixing zone 14 and the melt-conveying zone 16. Gate 20 separates the mixing zone 14 from the melt-conveying zone 16. An optional vent 22 is shown in FIG. 1 in the melt-conveying zone 16. As described above, the polyethylene is generally at least partially melted in mixing zone 14, and generally, but not necessarily, essentially completely melted in melt-conveying zone 16. The polyethylene is conveyed through the mixer discharge 18 and further processed, such as by pelletizing.

Figure 2:
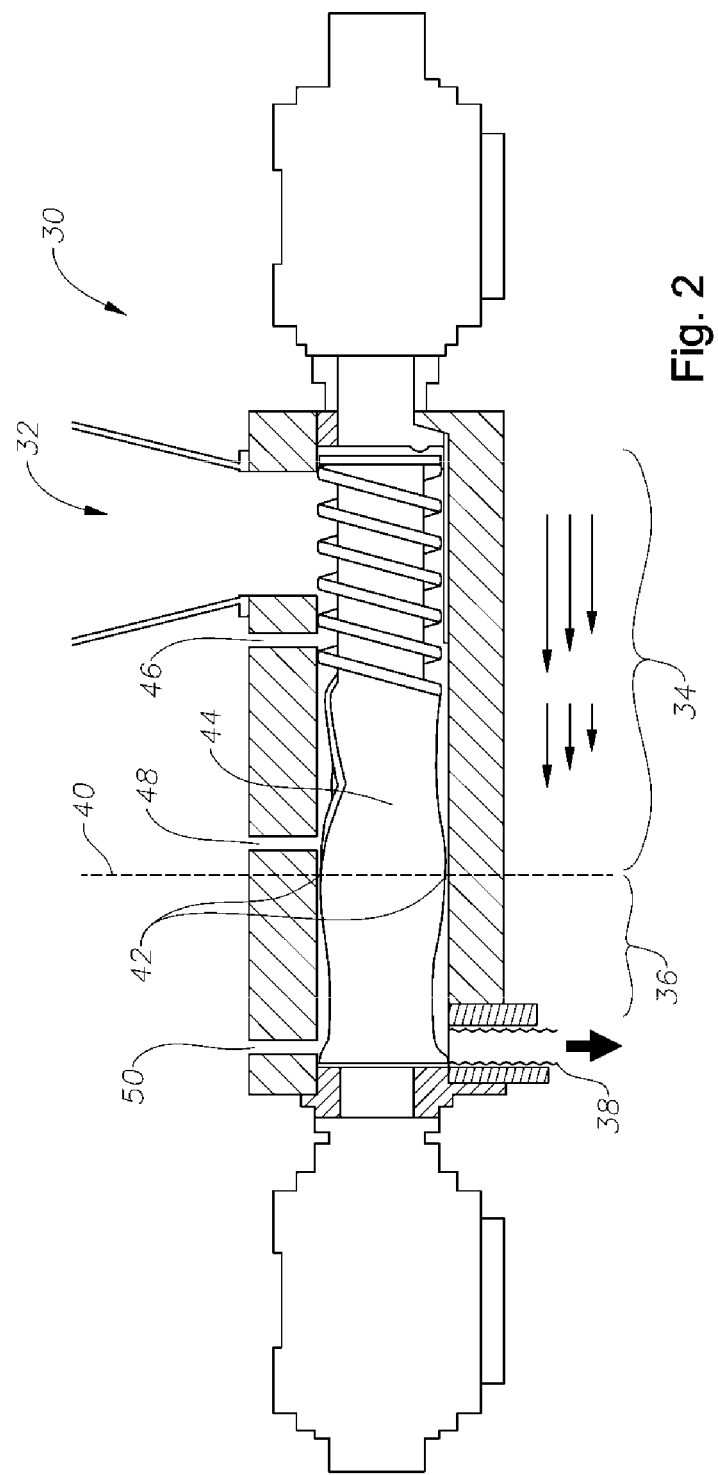
FIG. 2 is a schematic diagram of another mixer design useful in an embodiment of the invention.

Turning now to FIG. 2, specific reference is made to a mixer 30 of a different design. Mixer 30 includes a feed zone 32, a mixing zone 34, and a melt zone 36. Polyethylene and optional additives are provided to mixer 30 in the feed zone 32, and the polyethylene is conveyed in a downstream direction through the mixing zone 34 and the melt zone 36. As described above, the polyethylene is generally at least partially melted in mixing zone 34, and generally, but not necessarily, essentially completely melted in melt zone 36. The polyethylene is conveyed through the mixer discharge 38 and further processed, such as by pelletizing. Mixer 30 does not have a gate, such as gate 20 of the mixer 10, separating the mixing zone from the melt zone. However, mixing zone 34 and melt zone 36 are effectively separated by a narrow clearance region shown by dashed line 40 corresponding to the apex 42 of mixing element 44.

The polyethylene can be processed at a melt temperature of from a lower limit of about 355° F. (180° C.), preferably about 410° F. (210° C.), or about 420° F. (216° C.) or about 425° F. (218° C.), or about 428° F. (220° C.), to an upper limit of less than about 575° F. (300° C.), preferably less than 536° F. (280° C.), or less than 500° F. (260° C.), or less than about 490° F. (254° C.), or less than about 480° F. (249° C.), or less than about 470° F. (243° C.), or less than about 460° F. (238° C.), or less than about 450° F. (232° C.), or less than about 440° F. (227° C.), or less than about 430° F. (221° C.), where the melt temperature is the temperature at the downstream end of the mixing zone. In particular processes the melt temperature is maintained at a temperature of 410° F. to about 536° F. (210° C. to about 280° C.), preferably 428° F. to about 500° F. (220° C. to about 260° C.).

For example, in FIG. 1, the melt temperature is the temperature at gate 20, and in FIG. 2, the melt temperature is the temperature at the apex 42. It should be appreciated that mixers other than those illustrated herein can be used in the process of the invention.

The polyethylene is contacted with an oxygen-containing gas and optionally with at least one antioxidant, e.g., a primary antioxidant, a secondary antioxidant, etc. The oxygen-containing gas can be contacted with the polyethylene in the feed zone, the mixing zone or the melt zone, or in more than one of such zones. In any zone in which the oxygen-containing gas is contacted with the polyethylene, it can be contacted, for example, through one or more gas inlet ports. In some embodiments, supply of the oxygen-containing gas through only one inlet port is preferred. Referring to FIG. 1, for example, in some embodiments, oxygen-containing can be provided through one or both of inlets 24 and 26. Referring to FIG. 2, for example, in some embodiments, oxygen-containing gas can be contacted through one or both of inlets 46 and 48. It should be appreciated that these specific inlet positions are merely exemplary.

The oxygen-containing gas can be provided in as a continuous or intermittent flow. The oxygen-containing gas may be a mixture of gases, at least one of which is oxygen or it can consist essentially of oxygen. In one embodiment the oxygen-containing gas is air.

The oxygen concentration used can be expressed as parts by weight of $O_2$ per million parts by weight of polyethylene, abbreviated as ppm (wt) $O_2$. For a system in which the oxygen is provided as a continuous flow, the oxygen concentration in units of ppm (wt) $O_2$ can be calculated by normalizing the oxygen mass flow rate to the polyethylene mass flow rate. The oxygen mass flow rate can be measured using a conventional gas mass flow meter. For example, assume polyethylene was processed in a commercial-scale Kobe mixer operating at a polyethylene mass flow rate of 58,000 lb/hr (26,300 kg/hr). The source of oxygen was dry air, having an $O_2$ content of 21 wt. %, and the oxygen mass flow rate was 30 lb/hr (13.6 kg/hr). The normalized oxygen amount is calculated as:

$$ppm(wt)O_2 = \frac{30 \text{ lb air}/hr}{58,000 \text{ lb resin}/hr} \times 0.21 \text{ lb } O_2/\text{lb air}$$
$$= 1.09 \times 10^{-4} \text{ lb } O_2/\text{lb resin}$$
$$= 109 \text{ ppm(wt)}O_2.$$

The analogous calculation using SI units gives the same value, since the mass units cancel.

Oxygen can be provided in an amount of at least about 20.0 ppm (wt) $O_2$, or at least about 40.0 ppm (wt) $O_2$, or at least about 60.0 ppm (wt) $O_2$, or at least about 80.0 ppm (wt) $O_2$, or at least about 100.0 ppm (wt) $O_2$, or at least about 150.0 ppm (wt) $O_2$, or at least about 200.0 ppm (wt) $O_2$, or at least about 250.0 ppm (wt) $O_2$, or at least about 3000 ppm (wt) $O_2$, or at least about 350.0 ppm (wt) $O_2$, or at least about 400.0 ppm (wt) $O_2$, or at least about 450.0 ppm (wt) $O_2$, or at least about 500.0 ppm (wt) $O_2$. The upper limit of the oxygen amount depends on the degree of oxygen tailoring desired. If too much oxygen is used, an unacceptable amount of polyethylene degradation will occur, as evidenced by a loss in various polyethylene properties. Generally, the oxygen concentration will be no more than 2500.0 ppm or 1250.0 ppm (wt) $O_2$.

In some embodiments, the oxygen concentration is ≤450.0 ppm (wt) $O_2$, or 350.0 ppm (wt) $O_2$, or ≤300.0 ppm (wt) $O_2$, or ≤250.0 ppm (wt) $O_2$, or ≤200.0 ppm (wt) $O_2$. Ranges from any recited lower limit to any recited upper limit are also contemplated. In particular embodiments, the oxygen concentration is 80.0 to about 300.0 ppm (wt) $O_2$. In some embodiments, the oxygen concentration is provided by supplying air at a rate of 1.0 liter/min. or less.

Typically, although it is not critical, the process further comprises providing a primary antioxidant to a mixer/extruder zone selected from the feed zone, the melt-mixing zone, or the melt zone. In some embodiments, the primary antioxidant is provided to a zone upstream of the zone in which the first polyethylene is contacted with oxygen-containing gas. In other embodiments, the primary antioxidant is provided to a zone downstream of the zone in which the first polyethylene is contacted with oxygen-containing gas. In some instances it may be preferred or economical to provide the primary antioxidant to the feed zone and the oxygen-containing gas to the melt zone. Providing the primary antioxidant upstream of contacting oxygen with polyethylene means to add the primary antioxidant at any point before the addition of the oxygen i.e., the primary antioxidant and the oxygen can be added in the same or different zone, so long as the primary antioxidant is added before the oxygen. Likewise, providing the primary antioxidant downstream of contacting oxygen with polyethylene means to add the primary antioxidant at any point after the addition of the oxygen, i.e., the primary antioxidant and the oxygen can be added in the same or different zone, so long as the primary antioxidant is added after the oxygen. Moreover, primary antioxidant can be contacted with the polyethylene contemporaneously with the contacting of oxygen. It has been found, however, that color is improved when the primary antioxidant is contacted with the polyethylene downstream of contacting the polyethylene with oxygen. Primary antioxidant can be provided in one or more of the feed zone, melt-mixing zone, and melt zone. Additionally, primary antioxidants can be added through one or more inlets. Referring to FIG. 1, primary antioxidant can be provided, for example, through inlet 28 near the end of the melt zone. Referring to FIG. 2, primary antioxidant can be provided, for example, through inlet 50 near the end of the melt zone. It should be appreciated that these specific inlet positions are merely exemplary.

Examples of primary antioxidants, sometimes termed "long-term antioxidants," include phenolic antioxidants and hindered amine antioxidants, such as are disclosed in U.S. Pat. No. 6,392,056. Suitable primary antioxidants are available commercially, such as the IRGANOX™ antioxidants available from BASF. Examples of suitable antioxidants, including phenolic antioxidants and hindered amine antioxidants, are described in U.S. Pat. No. 7,285,617, the disclosure of which is incorporated herein in its entirety.

If desired, secondary antioxidants, sometimes termed "short-term antioxidants," can be added to the mixer/extruder at any convenient location. Typically, the secondary antioxidant can be provided in one or more of the feed zone, melt-mixing zone, and melt zone. Additionally, secondary antioxidants can be added through one or more inlets. Thus, some embodiments provide a process further comprising providing a secondary antioxidant to a zone selected from the feed zone, the melt-mixing zone, or the melt zone. In some embodiments, the secondary antioxidant is provided to a zone upstream of the zone in which the first polyethylene is contacted with oxygen-containing gas. In other embodiments, the secondary antioxidant is provided to a zone downstream of the zone in which the first polyethylene is contacted with oxygen-containing gas. In still other embodiments, secondary antioxidant can be contacted with the polyethylene contemporaneously with the contacting of oxygen. It has been found that color is improved when the secondary antioxidant is contacted with the polyethylene downstream of contacting the polyethylene with oxygen. Typical secondary antioxidants are available commercially, such as the IRGAFOS™ antioxidants available from BASF.

Examples of secondary antioxidants include, for example, aliphatic thiols and phosphites. Specific examples of secondary antioxidants include distearyl pentaerythritol diphosphite, isodecyl diphenyl phosphite, diisodecyl phenyl phosphite, tris(2,4-di-t-butylphenyl)phosphite, dilauryl-β,β-thiodipropionate, β-naphthyl disulfide, thiol-β-naphthol, 2-mercaptobenzothiazole, benzothiazyl disulfide, phenothiazine, tris(p-nonylphenyl)phosphite, and zinc dimethyldithiocarbamate.

The Tailored Polyethylene

The product of the oxygen tailoring process is a tailored polyethylene having a density from 0.870 to greater than 0.950 g/cm$^3$, 0.910 to 0.950 g/cm$^3$, 0.915 to 0.940 g/cm$^3$, or 0.918 to 0.925 g/cm$^3$. The MWD of the tailored polyethylene is typically 3.0 to about 10.0, preferably 3.0 to 8.0, or 3.0 to 6.0.

In some embodiments, the tailored polyethylene has a melt index, $I_{2.16}$, of ≤5.0 g/10 min. Preferably, the melt index of the tailored polyethylene is from 0.05 to 4.5 g/10 min., or 0.05 to 2.0 g/10 min. In some embodiments, the lower limit on the range of the melt index is 0.1 g/10 min., 0.2 g/10 min., 0.5 g/10 min., 0.75 g/10 min., 1.0 g/10 min., 1.2 g/10 min., 1.5 g/10 min., 1.7 g/10 min., 1.8 g/10 min., or 1.9 g/10 min. The upper limit on the melt index can be 0.1 g/10 min., 0.2 g/10 min., 0.5 g/10 min., 0.75 g/10 min., 1.0 g/10 min., 1.2 g/10 min., 1.5 g/10 min., 1.7 g/10 min., 1.8 g/10 min., or 1.9 g/10 min. While the range of suitable melt indices can be any combination of lower and upper limits, the melt index of the tailored polyethylene is preferably from 0.1 to 3.0 g/10 min., 0.15 to 2.0 g/10 min., or 0.30 to 1.0 g/10 min.

The high-load melt index of the tailored polyethylene may be 1.0 to 1.0×10$^3$ g/10 min. The lower and upper limits on the range of the high-load melt index may individually be selected from 1.0 g/10 min., 2.0 g/10 min., 4.0 g/10 min., 10.0 g/10 min., 15.0 g/10 min., 25.0 g/10 min., 30.0 g/10 min., 50.0 g/10 min., 75.0 g/10 min., 100.0 g/10 min., 125.0 g/10 min., 150.0 g/10 min., 175.0 g/10 min., 205.0 g/10 min., 250.0 g/10 min., 265.0 g/10 min., 300.0 g/10 min., 400.0 g/10 min., 500.0 g/10 min., 750.0 g/10 min., or 1000.0 g/10 min. While the high-load melt index range can be any combination of lower and upper limits, some exemplary high-load melt index ranges are include about 4.0 to 300.0 g/10 min., about 15.0 to about 265.0 g/10 min., about 30.0 to about 235.0 g/10 min., about 50.0 to about 205.0 g/10 min., or about 90.0 to about 150.0 g/10 min.

The tailored polyethylene typically has a melt index ratio, $I_{21.6}/I_{2.16}$, of 10.0 to 200.0. The lower and upper limits on the range of the melt index ratio may individually be selected from 15.0, 20.0, 25.0, 30.0, 40.0, 50.0, 60.0, 75.0, 100.0, 120.0, 130.0, 140.0, 150.0, 175.0, 190.0, or 200.0. While the range of suitable melt index ratio can be any combination of lower and upper limits, some exemplary melt index ratios are 30.0 to 150.0, 40.0 to 120.0, 50.0 to 100.0, or 60.0 to 85.0.

In some embodiments, the process selectively increases the high-load melt index, $I_{21.6}$, of the polyethylene supplied to the mixer or extruder, i.e., the first polyethylene. The result is a tailored polyethylene having a melt index within 40.0% of the melt index of the first polyethylene supplied to the mixer or extruder and a high-load melt index at least 20% higher, preferably at least 40.0% to 250.0% higher (e.g., 25.0%, 30.0%, 35.0%, 40.0%, 45.0%, 50.0%, 55.0%, or 60.0% higher), than the high-load melt index of the first polyethylene as supplied to the mixer or extruder. Some tailored polyethylenes have a melt index within 30.0%, preferably within 15.0%, more preferably within 10.0%, 5.0%, or 1.0%, of the melt index of the first polyethylene and a high load melt index at least 20.0% higher, preferably at least 40.0% higher, at least 60.0%, at least 80.0%, at least 100.0%, or at least 120.0% than the high-load melt index of the first polyethylene as supplied to the mixer or extruder.

In particular embodiments, the first polyethylene supplied to the mixer or extruder has a melt index of 0.1 to 2.0 g/10 min., preferably 0.1 to 1.0 g/10 min., and a high-load melt index of from 1.0 to 50.0 g/10 min., preferably 5.0 to 25.0 g/10 min., and the tailored polyethylene has a melt index within 5.0%, preferably within 2.0%, more preferably within 1.0%, of the melt index of the first polyethylene and a high load melt index at least 10.0% higher, preferably at least 20.0% higher, at least 30.0%, at least 40.0%, at least 50.0% or at least 75.0% higher, than the high-load melt index of the first polyethylene. Particularly such tailored polyethylenes have a high-load melt index of 10.0 to 200.0 g/10 min., particularly 20.0 to 120.0 g/10 min., or 20.0 to 40.0 g/10 min.

In particular embodiments, the tailored polyethylene has a density of 0.915 to 0.940 g/cm$^3$, a high-load melt index of 10.0 to 100.0 g/10 min., a melt index ratio ($I_{21.6}/I_{2.16}$) of 40.0 to 100.0, and a MWD of 3.5 to 10.0. Such polyethylenes are particularly suited for use as wire and cable coatings.

While polyethylenes, such as Enable™ metallocene polyethylene, typically show improved performance in silane crosslinking, the high viscosity and narrow MWD of such polyethylenes lead to higher shear/friction in the extruder during silane grafting process step. By applying oxygen tailoring process according to the invention to such metallocene polyethylenes, a tailored composition suitable for cast films and wire and cable coatings is obtainable. Thus, in some embodiments, the invention provides a polyethylene suitable for wire and cable or cast film processing conditions, while avoiding detrimentally reducing the silane crosslinking efficiency of the untailored (i.e., first) polyethylene. Such polyethylenes thereby provide wire and cable and/or cast film compositions having a lower silane content (e.g., via grafting) compared to conventionally available polyethylenes (e.g., Ziegler-Natta catalyzed linear low density polyethylene and high pressure LDPE). In some embodiments the tailored polyethylene has a silane content ≤1.0 wt. %, preferably ≤0.8 wt. % or ≤0.6 wt. %, or typically from 0.5 wt. % to 1.0 wt. %, preferably about 0.6 wt. % to about 0.8 wt. %.

PARTICULAR EMBODIMENTS

Embodiment A

A process for oxygen-tailoring a polyethylene, the process comprising: (a) conveying a first polyethylene having a melt index ≤5.0 and an MWD ≤5.0 through mixing or extrusion apparatus having a feed zone, a melt-mixing zone downstream of the feed zone, and a melt zone downstream of the melt-mixing zone, wherein the temperature of the first polyethylene in the melt zone ranges from about 180° C. to about 300° C.; and (b) contacting the first polyethylene with an amount of an oxygen-containing gas having at least about 20.0 parts by weight oxygen per million per parts by weight of the first polyethylene (ppm (wt) $O_2$).

Embodiment B

The process of Embodiment A, wherein the process provides a tailored polyethylene having a melt index ratio ($I_{21.6}/I_{2.16}$) of 30.0 to 150.0, preferably 40.0 to 100.0, and a MWD of 3.0 to 10.0, preferably 3.0 to 8.0, or more preferably 3.0 to 6.0.

Embodiment C

Any of Embodiments A-B, wherein contacting the first polyethylene with an amount of an oxygen-containing gas comprises contacting the first polyethylene with at least 40.0 ppm, (wt) $O_2$, preferably no more than about 1000.0 or 500.0 ppm, (wt) $O_2$.

Embodiment D

Any of Embodiments A-C, wherein contacting the first polyethylene with an amount of an oxygen-containing gas comprises contacting the first polyethylene with about 80.0 to about 300.0 ppm (wt) $O_2$.

Embodiment E

Any of Embodiments A-D, wherein the temperature of the first polyethylene ranges from about 210.0° C. to about 260.0° C., preferably 220.0° C. to 240.0° C. in the melt zone.

Embodiment F

Any of Embodiments A-E, wherein contacting the first polyethylene with the oxygen comprises providing the oxygen-containing gas to a zone selected from the feed zone, the melt-mixing zone, or the melt zone.

Embodiment G

Any of Embodiments A-F, further comprising providing a primary antioxidant to a zone selected from the feed zone, the melt-mixing zone, or the melt zone.

Embodiment H

Any of Embodiments A-F, further comprising providing a primary antioxidant to a zone selected from the feed zone, the melt-mixing zone, or the melt zone, wherein the primary antioxidant is provided to a zone upstream of the zone in which the first polyethylene is contacted with oxygen-containing gas.

Embodiment I

Any of Embodiments A-F, further comprising providing a primary antioxidant to a zone selected from the feed zone, the melt-mixing zone, or the melt zone, wherein the primary antioxidant is provided to a zone upstream of the zone in which the first polyethylene is contacted with oxygen-containing gas.

Embodiment J

Any of Embodiments A-F, further comprising providing a primary antioxidant to the feed zone and wherein contacting the polyethylene with the oxygen-containing gas occurs in the melt zone.

Embodiment K

Any of Embodiments A-J, wherein the oxygen-containing gas is a mixture of gases.

Embodiment L

Any of Embodiments G-K, wherein the primary antioxidant comprises a phenolic antioxidant, a hindered amine antioxidant, or mixtures thereof.

Embodiment M

Any of Embodiments G-L, further comprising providing a secondary antioxidant to a zone selected from the feed zone, the melt-mixing zone, or the melt zone.

Embodiment N

Any of Embodiments G-L, further comprising providing a secondary antioxidant to a zone selected from the feed zone, the melt-mixing zone, or the melt zone, wherein the secondary antioxidant is provided upstream of the oxygen-containing gas.

Embodiment O

Any of Embodiments G-L, further comprising providing a secondary antioxidant to a zone selected from the feed zone, the melt-mixing zone, or the melt zone, wherein the secondary antioxidant is provided downstream of the oxygen-containing gas.

Embodiment P

Any of Embodiments A-O, wherein the first polyethylene has a density 0.860 to 0.970 g/cm$^3$, preferably 0.910 to 0.950 g/cm$^3$, preferably 0.915 to 0.940 g/cm$^3$, preferably 0.918 to 0.925 g/cm$^3$.

Embodiment Q

A method for selectively increasing the high-load melt index of a polyethylene, the method comprising (a) conveying a first polyethylene having a first melt index ≤5.0 g/10 min., and a first high-load melt index through an extrusion apparatus, the extrusion apparatus having a feed zone, a melt-mixing zone downstream of the feed zone, and a melt zone downstream of the melt-mixing zone, wherein the temperature of the polyethylene in the melt zone ranges from about 180.0° C. to about 300.0° C.; (b) contacting the first polyethylene with an amount of an oxygen-containing gas having at least about 20.0 parts by weight oxygen per million parts by weight polyethylene (ppm (wt) $O_2$); and (c) thereby forming a tailored polyethylene having a second melt index within 40.0%, 30.0%, 20.0%, 10.0%, 5.0%, or 1.0% of the first melt index and a second high-load melt index at least 10.0% higher, at least 20.0% higher, at least 40.0% higher, at least 60.0%, at least 80.0%, at least 100.0%, or at least 120.0% than the first high-load melt index.

Embodiment R

Embodiment Q, wherein the first melt index is 0.1 to 2.0 g/10 min., preferably 0.1 to 1.0 g/10 min., the first high-load melt index is 1.0 to 50.0 g/10 min., preferably 5.0 to 25.0 g/10 min., the second melt index within 5.0%, preferably within 2.0% of the first melt index, and the second high-load melt index is at least 10% higher, preferably at least 20.0% higher, than the first high-load melt index.

Embodiment S

Any of Embodiments Q-R, wherein the second high-load melt index is 10.0 to 100.0 g/10 min.

Embodiment T

Any of Embodiments Q-S, further comprising contacting the first polyethylene with a primary antioxidant comprising a phenolic antioxidant, a hindered amine antioxidant, or mixtures thereof, prior to contacting the polymer with an amount of an oxygen-containing gas; wherein contacting the polymer with an amount of an oxygen-containing gas comprises contacting the polymer with the oxygen-containing gas in a zone selected from the feed zone, the melt-mixing zone, or the melt zone, with about 40.0 to about 500.0 ppm (wt) $O_2$; wherein the temperature of the first polyethylene ranges from about 180° C. to 300° C., preferably 216° C. to about 260° C., preferably 218° C. to about 232° C. in the melt zone; and wherein the first polyethylene has a density of 0.915 to 0.940 g/cm³.

Embodiment U

Any of Embodiments Q-T, wherein the first polyethylene has a MWD ≤5.0.

Embodiment V

Any of Embodiments Q-U, further comprising forming the tailored polyethylene into a wire or cable coating.

Embodiment W

The tailored polyethylene made according to or obtainable from the process of any of Embodiments A-V.

Embodiment X

An article of manufacture made according to or obtainable from a tailored polyethylene made according to or obtainable from any of Embodiments A-V.

Embodiment Y

A wire and cable coating composition comprising a polyethylene having a density of 0.915 to 0.940 g/cm³, a high-load melt index of 25.0 to 600.0 g/10 min., a melt index ratio ($I_{21.6}/I_{2.16}$) of 60.0 to 150.0, and a MWD of 3.0 to 10.0.

Embodiment Z

The wire and cable coating composition of Embodiment Y, wherein the polyethylene has a silane content ≤1.0 wt. %, preferably 0.6 wt. %, or 0.8 wt. %, based on the total weight of the polyethylene.

EXAMPLES

Comparative Example 1

In Comparative Example 1, a metallocene catalyzed ethylene-hexene copolymer resin having a melt index $I_{2.16}$ of about 0.405 g/10 min., a high load melt index ($I_{21.6}$) of about 17.5 g/10 min., a melt index ratio ($I_{21.6}/I_{2.16}$) of 43.11, and a density of 0.920 g/cm³ is processed at a melt temperature of 405° F. (207° C.) under a nitrogen atmosphere with primary antioxidant added upstream. A feed rate of 50,000 lb/hr (22,727 kg/hr) to 55,000 lb/hr (25,000 kg/hr) is maintained.

Example 1

Comparative Example 1 is substantially repeated except that the polyethylene is subject to oxygen tailoring in an extruder having 9 zones before the die. Each of the zones are maintained at 220° C. The melt and die temperatures are 252° C. and 200° C., respectively. The extruder operates at a screw speed of 200 RPM and a pressure of 92-97 bar with a residence time of about 60 seconds. Oxygen is provided in the form of air at a rate of 1.0 liter/minute downstream of the feedzone in a melt mixing zone. Samples of the resulting tailored polyethylene are collected at 30 minute intervals. Table 1 illustrates that one effect of this tailoring is to increase the high-load melt index without significantly affecting the melt index.

TABLE 1

|  | Time (min) | $I_{2.16}$ (g/10 min) | $I_{21.6}$ (g/10 min) | MIR ($I_{21.6}/I_{2.16}$) |
|---|---|---|---|---|
| Comp. Ex. 1 | 0 | 0.405 | 17.46 | 43.11 |
| Ex. 1 | 30 | 0.371 | 23.56 | 63.50 |
| Ex. 1a | 60 | 0.371 | 23.20 | 62.53 |
| Ex. 1b | 90 | 0.370 | 23.89 | 64.57 |
| Ex. 1c | 120 | 0.381 | 23.12 | 60.68 |
| Ex. 1d | 150 | 0.391 | 23.20 | 59.34 |
| Ex. 1e | 180 | 0.369 | 23.47 | 63.60 |
| Ex. 1f | 210 | 0.378 | 24.31 | 64.31 |
| Ex. 1g | 240 | 0.394 | 24.94 | 63.20 |
| Ex. 1h | 270 | 0.368 | 23.00 | 62.50 |
| Ex. 1i | 300 | 0.394 | 24.35 | 61.80 |
| Ex. 1j | 330 | 0.410 | 24.99 | 60.95 |

Examples 2-4

Figure 3:
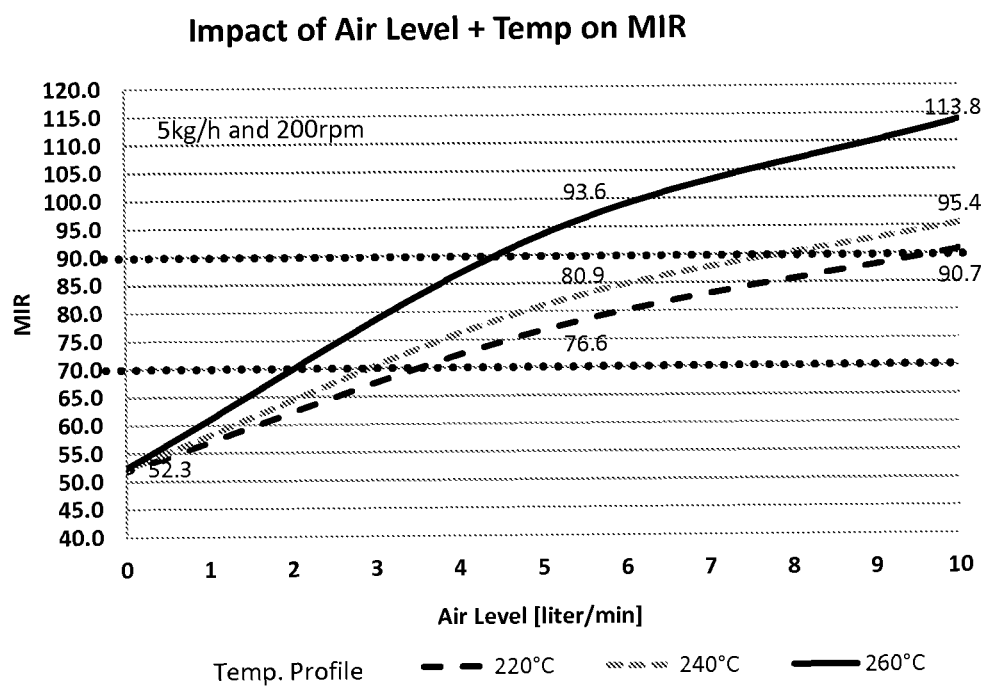
FIG. 3 graphically represents the effect of processing conditions on the melt index ratio observed in some embodiments of the invention.

Examples 2-4 are intended to show the effects of oxygen content and temperature on the resulting polymer. In each of Examples 2-4, Example 1 is substantially repeated with the resin being subjected to different temperatures and levels of oxygen in the extruder otherwise operating consistent with the parameters of Example 1. Table 2 shows the results of the examples. The results are graphically represented in FIG. 3.

TABLE 2

|  | Example | | | | | | | | |
|---|---|---|---|---|---|---|---|---|---|
|  | 2a | 2b | 2c | 3a | 3b | 3c | 4a | 4b | 4c |
| Temp profile (° C.) | 220 | 220 | 220 | 240 | 240 | 240 | 260 | 260 | 260 |
| Feed rate (kg/h) | 5 | 5 | 5 | 5 | 5 | 5 | 5 | 5 | 5 |
| Screw speed (rpm) | 200 | 200 | 200 | 200 | 200 | 200 | 200 | 200 | 200 |
| Air flow (l/min) | 10 | 5 | 0 | 10 | 5 | 0 | 10 | 5 | 0 |
| $I_2$ (g/10 min) | 0.29 | 0.32 | 0.40 | 0.29 | 0.31 | 0.40 | 0.26 | 0.29 | 0.42 |
| $I_{21.6}$ (g/10 min) | 26.31 | 24.50 | 20.71 | 27.66 | 25.09 | 20.86 | 29.60 | 27.15 | 21.98 |
| MIR ($I_{21.6}/I_2$) | 90.7 | 76.6 | 51.8 | 95.4 | 80.9 | 52.2 | 113.8 | 93.6 | 52.3 |

Examples 5a-p

Figure 4:
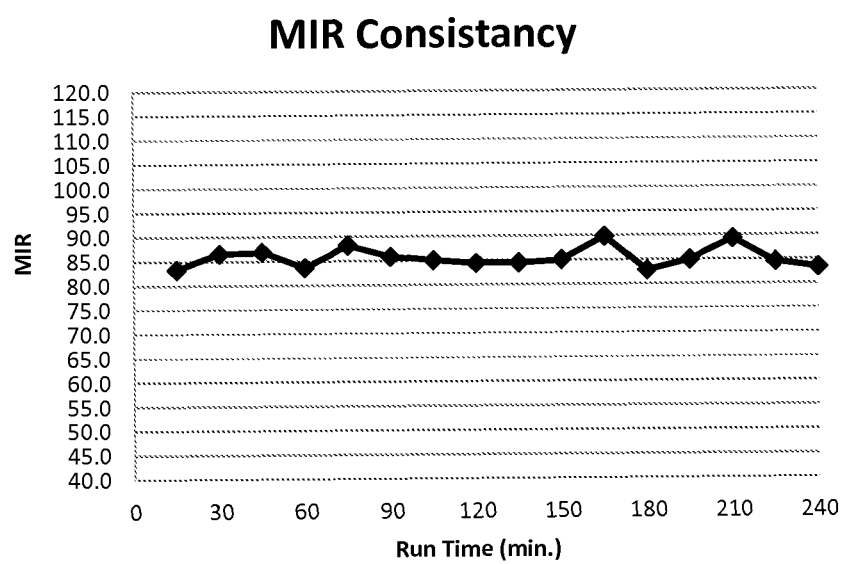
FIG. 4 graphically represents the stability of the melt flow ratio over time for some embodiments of the invention.

Examples 5a-p are intended to illustrate the relative stability of the properties of the tailored polyethylene over an extended period of time. In Examples 5a-p, Example 1 is substantially repeated under the conditions described in Table 3 with the product of the process being sampled every 15 minutes over 240 minutes. The results of Examples 5a-p are graphically represented in FIG. 4.

TABLE 3

| | Example | | | | | | | |
|---|---|---|---|---|---|---|---|---|
| | 5a | 5b | 5c | 5d | 5e | 5f | 5g | 5h |
| Run Time (min) | 15 | 30 | 45 | 60 | 75 | 90 | 105 | 120 |
| Temp profile (° C.) | 220 | 220 | 220 | 220 | 220 | 220 | 220 | 220 |
| Feed rate (kg/h) | 5 | 5 | 5 | 5 | 5 | 5 | 5 | 5 |
| Screw speed (rpm) | 275 | 290 | 290 | 290 | 290 | 290 | 290 | 290 |
| Air flow (l/min) | 5 | 5 | 5 | 5 | 5 | 5 | 5 | 5 |
| $I_2$ | 0.35 | 0.35 | 0.35 | 0.36 | 0.35 | 0.37 | 0.36 | 0.37 |
| $I_{21.6}$ | 29.15 | 30.28 | 30.39 | 30.10 | 30.85 | 31.76 | 30.61 | 31.24 |
| MIR ($I_{21.6}/I_2$) | 83.3 | 86.5 | 86.8 | 83.6 | 88.1 | 85.8 | 85.0 | 84.4 |

| | Example | | | | | | | |
|---|---|---|---|---|---|---|---|---|
| | 5i | 5j | 5k | 5j | 5m | 5n | 5o | 5p |
| Run Time (min) | 135 | 150 | 165 | 180 | 195 | 210 | 225 | 240 |
| Temp profile (° C.) | 220 | 220 | 220 | 220 | 220 | 220 | 220 | 220 |
| Feed rate (kg/h) | 5 | 5 | 5 | 5 | 5 | 5 | 5 | 5 |
| Screw speed (rpm) | 290 | 290 | 290 | 290 | 290 | 290 | 290 | 290 |
| Air flow (l/min) | 5 | 5 | 5 | 5 | 5 | 5 | 5 | 5 |
| $I_2$ | 0.36 | 0.36 | 0.35 | 0.38 | 0.38 | 0.36 | 0.36 | 0.36 |
| $I_{21.6}$ | 30.4 | 30.6 | 31.44 | 31.44 | 32.29 | 32.14 | 30.41 | 30 |
| MIR ($I_{21.6}/I_2$) | 84.4 | 85.0 | 89.8 | 82.7 | 85.0 | 89.3 | 84.5 | 83.3 |

Tailoring of the metallocene ethylene-hexene polymer can result in one or more of the following: increased branching, higher unsaturation, improved rheology at higher shear rate, reduced melt fracture sensitivity, and/or lower extrusion pressure.

All documents referred to above are incorporated by reference herein in their entirety unless stated otherwise, including any priority documents and/or testing procedures to the extent they are not inconsistent with this text, provided however that any priority document not named in the initially filed application or filing documents is NOT incorporated by reference herein. As is apparent from the foregoing general description and the specific embodiments of the invention, while forms of the invention have been illustrated and described, various modifications can be made without departing from the spirit and scope of the invention. Accordingly, it is not intended that the invention be limited thereby. In some embodiments of the invention, the polyethylenes described herein are substantially free (i.e., present only at impurity levels or not purposely added to a described composition) of any additive or component not specifically enumerated herein. Advantages described for certain embodiments may or may not be present in other embodiments. Likewise, the term "comprising" is considered synonymous with the term "including" for purposes of Australian law. Whenever a composition, group of elements, or process is described with an open-ended term such as "comprising", it should be understood that embodiments of the invention are envisioned where the composition, group of elements, or process features "consist essentially of," or "consist of" the recited composition, group of elements, or process features.

What is claimed is:

1. A process for oxygen-tailoring a polyethylene, the process comprising:
   (a) conveying a first polyethylene having a melt index ≤5.0, a high-load melt index ≥15, and an MWD ≤5.0 through mixing or extrusion apparatus having a feed zone, a melt-mixing zone downstream of the feed zone, and a melt zone downstream of the melt-mixing zone, wherein the temperature of the first polyethylene in the melt zone ranges from about 180° C. to about 300° C.; and
   (b) contacting the first polyethylene with an amount of an oxygen-containing gas having at least about 20.0 parts by weight oxygen per million per parts by weight of the first polyethylene (ppm (wt) $O_2$);
wherein the high-load melt index increases while the melt index remains substantially the same after the first polyethylene contacts the oxygen-containing gas.

2. The process of claim 1, wherein the process provides a tailored polyethylene having a melt index ratio ($I_{21.6}/I_{2.16}$) of 30.0 to 150.0.

3. The process of claim 1, wherein the process provides a tailored polyethylene having a melt index ratio ($I_{21.6}/I_{2.16}$) of 40.0 to 100.0.

4. The process of claim 1, wherein contacting the first polyethylene with an amount of an oxygen-containing gas comprises contacting the first polyethylene with at least 40.0 ppm (wt) $O_2$.

5. The process of claim 1, wherein contacting the first polyethylene with an amount of an oxygen-containing gas comprises contacting the first polyethylene with about 80.0 to about 300.0 ppm (wt) $O_2$.

6. The process of claim 1, wherein the temperature of the first polyethylene ranges from about 210° C. to about 280° C. in the melt zone.

7. The process of claim 1, wherein contacting the first polyethylene with the oxygen comprises providing the oxygen-containing gas to a zone selected from the feed zone, the melt-mixing zone, or the melt zone.

8. The process of claim 7, further comprising providing a primary antioxidant to a zone selected from the feed zone, the melt-mixing zone, or the melt zone.

9. The process of claim 8, wherein the primary antioxidant is provided to a zone upstream of the zone in which the first polyethylene is contacted with oxygen-containing gas.

10. The process of claim 9, wherein the primary antioxidant is provided to the feed zone and wherein contacting the polyethylene with the oxygen-containing gas occurs in the melt zone.

11. The process of claim 1, wherein the oxygen-containing gas is a mixture of gases.

12. The process of claim 8, wherein the primary antioxidant comprises a phenolic antioxidant, a hindered amine antioxidant, or mixtures thereof.

13. The process of claim 8, further comprising providing a secondary antioxidant to a zone selected from the feed zone, the melt-mixing zone, or the melt zone.

14. The process of claim 13, wherein the secondary antioxidant is provided to a zone upstream of the zone in which the first polyethylene is contacted with oxygen-containing gas.

15. The process of claim 13, wherein the secondary antioxidant is provided to a zone downstream of the zone in which the first polyethylene is contacted with oxygen-containing gas.

16. The process of claim 1, wherein the first polyethylene has a density 0.860 to 0.970 g/cm$^3$.

17. A method for selectively increasing the high-load melt index of a polyethylene, the method comprising:
  (a) conveying a first polyethylene having a first melt index ≤5.0 g/10 min., an MWD ≤5.0, and a first high-load melt index through an extrusion apparatus, the extrusion apparatus having a feed zone, a melt-mixing zone downstream of the feed zone, and a melt zone downstream of the melt-mixing zone, wherein the temperature of the polyethylene in the melt zone ranges from about 180.0° C. to about 300.0° C.;
  (b) contacting the first polyethylene with an amount of an oxygen-containing gas having at least about 20 parts by weight oxygen per million parts by weight polyethylene (ppm (wt) $O_2$); and
  (c) thereby forming a tailored polyethylene having a second melt index within 40.0% of the first melt index and a second high-load melt index at least 10.0% higher than the first high-load melt index.

18. The process of claim 17, wherein the first melt index is 0.1 to 2.0 g/10 min., the first high-load melt index is 1.0 to 50.0 g/10 min., the second melt index within 5.0% of the first melt index, and the second high-load melt index is at least 10% higher than the first high-load melt index.

19. The process of claim 18, wherein the melt index is 0.1 to 1.0 g/10 min., the first high-load melt index is 5.0 to 25.0 g/10 min., second melt index is within 2.0% of the first melt index, and the second high-load melt index is at least 20% higher than the first high-load melt index.

20. The process of claim 19, wherein the second high-load melt index is 10.0 to 100.0 g/10 min.

21. The process of claim 17, further comprising contacting the first polyethylene with a primary antioxidant comprising a phenolic antioxidant, a hindered amine antioxidant, or mixtures thereof prior to contacting the polymer with an amount of an oxygen-containing gas;
  wherein contacting the polymer with an amount of an oxygen-containing gas comprises contacting the polymer with the oxygen-containing gas in a zone selected from the feed zone, the melt-mixing zone, or the melt zone with about 40.0 to about 500.0 ppm (wt) $O_2$;
  wherein the temperature of the first polyethylene ranges from about 180° C. to 300° C. in the melt zone; and
  wherein the first polyethylene has a density of 0.915 to 0.940 g/cm$^3$.

22. The process of claim 17, further comprising forming the tailored polyethylene into a wire or cable coating.

* * * * *